C. O. WILEY.
POST MOLDING MACHINE.
APPLICATION FILED MAR. 30, 1908.
929,906.
Patented Aug. 3, 1909.
4 SHEETS—SHEET 2.
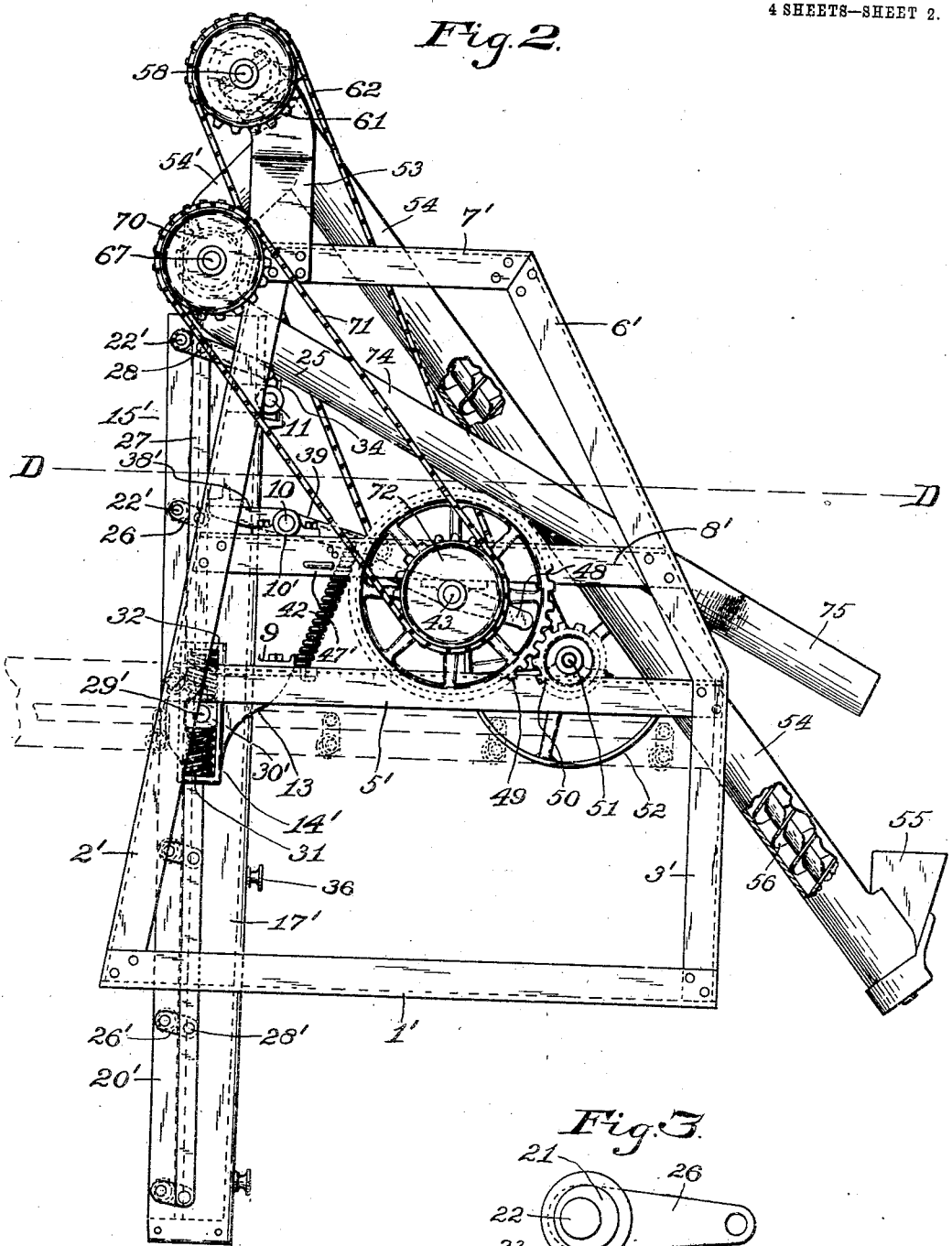
WITNESSES:
J. H. Gardner
K. R. Woddell
INVENTOR:
Charles O. Wiley,
BY
E. T. Silvius
ATTORNEY.

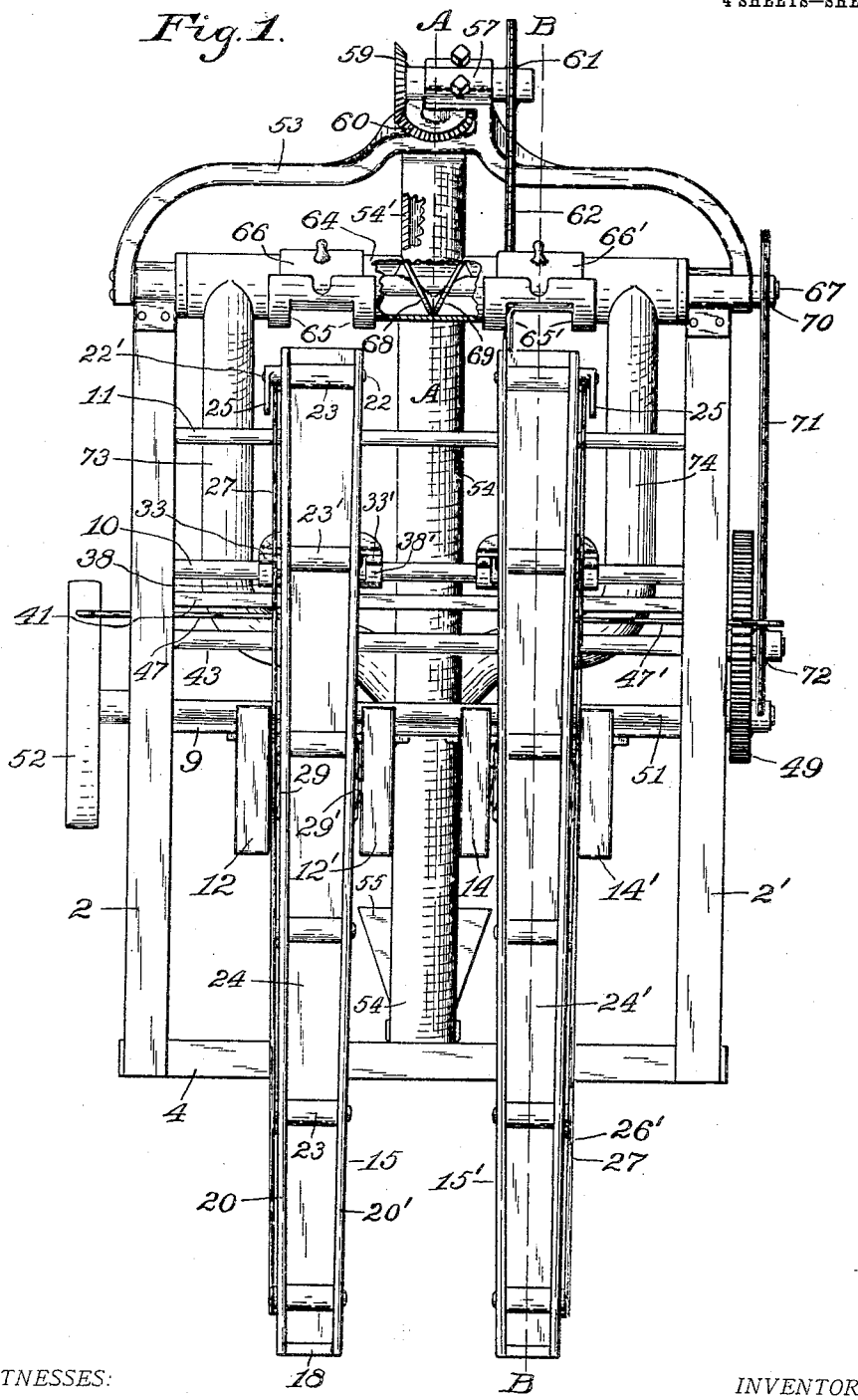

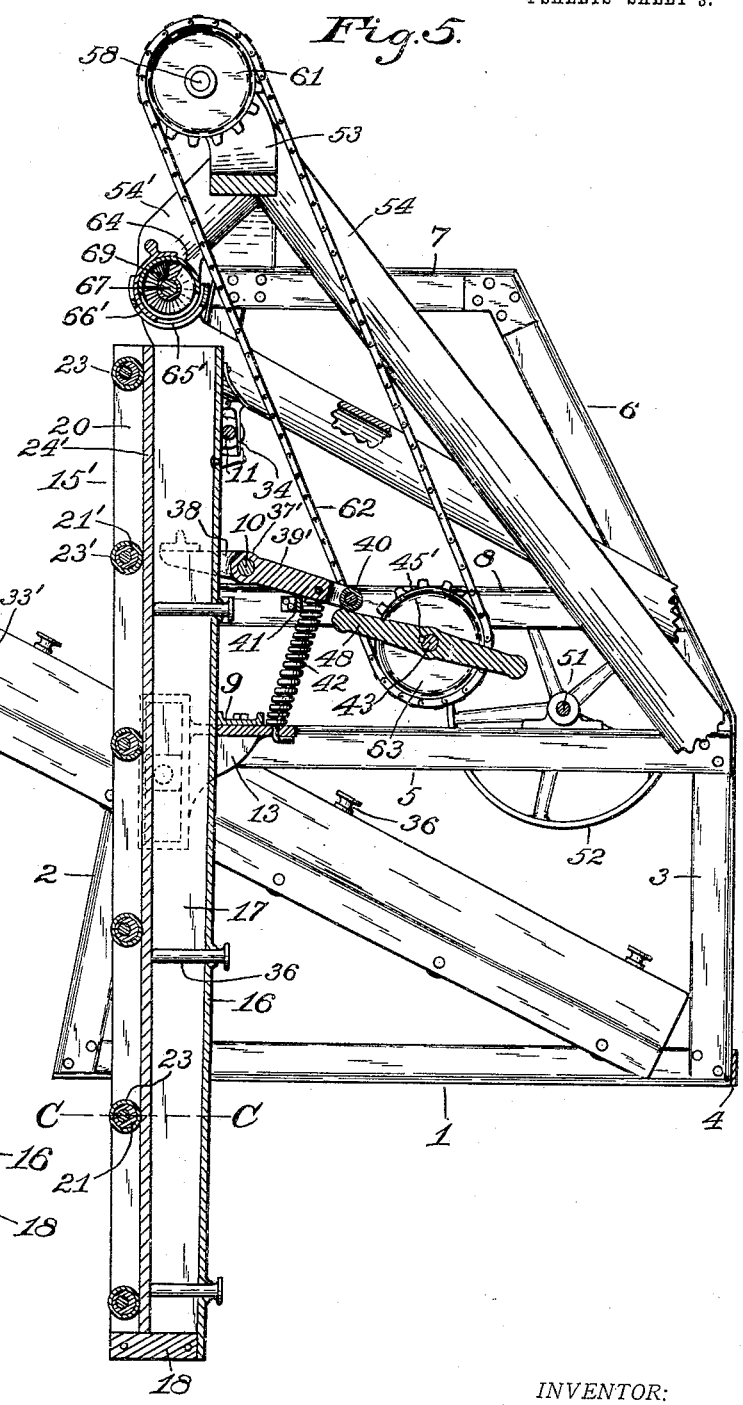
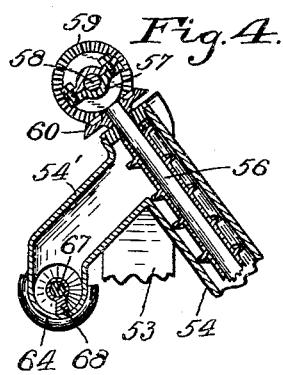

C. O. WILEY.
POST MOLDING MACHINE.
APPLICATION FILED MAR. 30, 1908.
929,906.
Patented Aug. 3, 1909.
4 SHEETS—SHEET 4.
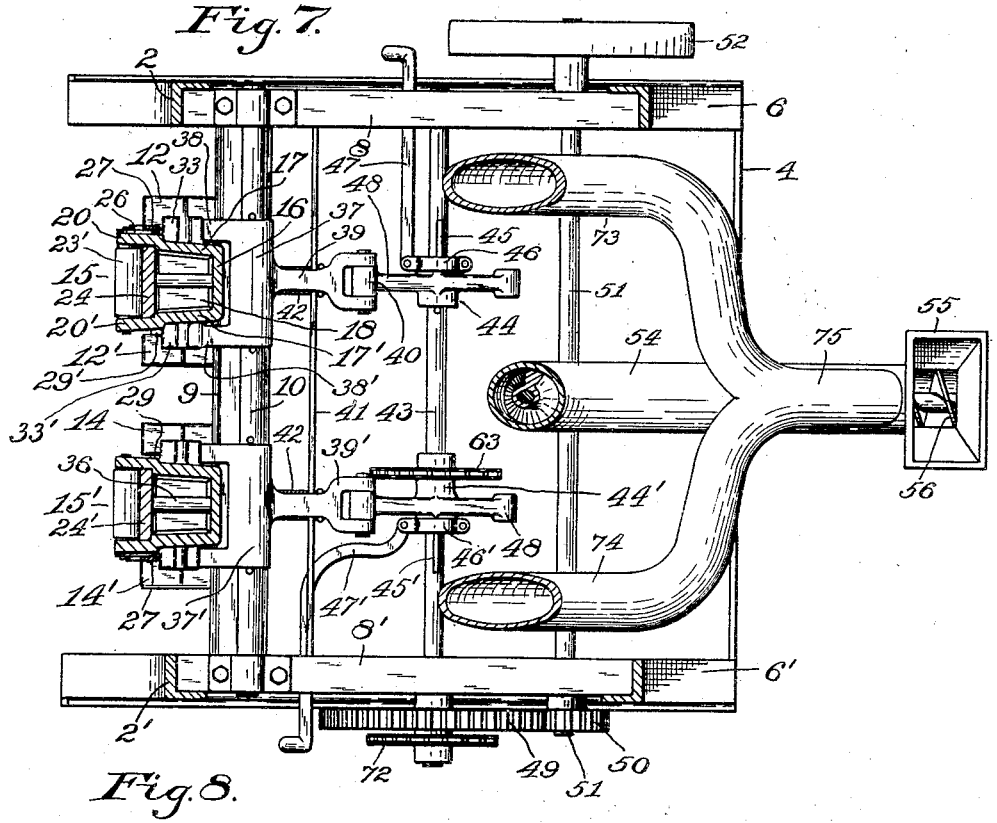
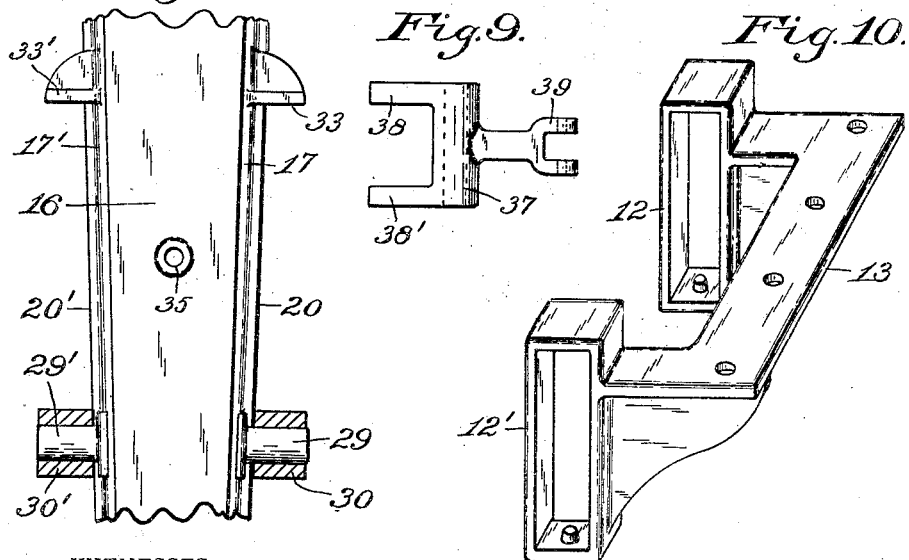
WITNESSES:
J. H. Gardner
K. R. Woddell
INVENTOR:
Charles O. Wiley,
BY
E. T. Silvius,
ATTORNEY.

UNITED STATES PATENT OFFICE.

CHARLES O. WILEY, OF DELPHI, INDIANA.

POST-MOLDING MACHINE.

No. 929,906.　　　　Specification of Letters Patent.　　　Patented Aug. 3, 1909.

Application filed March 30, 1908. Serial No. 424,049.

*To all whom it may concern:*

Be it known that I, CHARLES O. WILEY, a citizen of the United States, residing at Delphi, in the county of Carroll and State of Indiana, have invented certain new and useful Improvements in Post-Molding Machines; and I do declare the following to be a full, clear, and exact description of the invention, reference being had to the accompanying drawings, and to the figures of reference marked thereon, which form a part of this specification.

This invention relates to machines whereby concrete posts may be produced by the process of molding plastic material, the invention having reference more particularly to the molds in which the posts may be formed and to automatic apparatus for filling the molds with the plastic material, the invention having reference also to a method and means for packing the plastic material solidly in the molds.

Objects of the invention are to provide an improved method and apparatus for molding concrete posts that will enable manufacturers to produce concrete posts at a minimum cost and of uniformly superior quality.

The invention consists broadly in a machine having upright post-molds of novel form that are adapted to swing to approximately horizontal positions for removal of the posts, the machine having also conveyers that are arranged in novel manner for automatically filling the molds with plastic material.

The invention consists further in a new and novel method of packing the plastic material solidly in the molds, and further the invention comprises certain novel elements and combinations and arrangements thereof in post-mold machines as hereinafter particularly described and defined in the appended claims.

Referring to the drawings, Figure 1 is a front elevation of the improved molding machine; Fig. 2, a side elevation thereof in which one of the molds is indicated by broken lines in horizontal position; Fig. 3, a detail view of one of the parts of the improved post-molds; Fig. 4, a fragmentary vertical sectional view on the line A A in Fig. 1; Fig. 5, a vertical sectional view on the line B B in Fig. 1, in which one of the post-molds is in normal position and the other mold in an inclined position as when being moved to or from a horizontal position; Fig. 6, a transverse sectional view showing the permanently connected parts of a mold as on the line C C in Fig. 5; Fig. 7, a horizontal sectional view approximately on the line D D in Fig. 2; Fig. 8, a fragmentary rear elevation of the improved post-mold, and Figs. 9 and 10 detail views of parts of the machine.

Similar reference characters throughout the various figures of the drawings indicate corresponding elements or features of construction.

In a practical embodiment of the invention, a suitable framework is provided, which may be placed on any suitable foundation, the framework suitably comprising a pair of horizontal sills 1 and 1' on which are two leaning posts 2 and 2' for the forward parts of the framework, and two shorter posts 3 and 3' forming rear-parts; a horizontal tie-bar 4 connected to the rear ends of the sills; two horizontal rails 5 and 5' attached to the posts 2 and 2', and to the tops 3 and 3'; two leaning posts 6 and 6' extending upward from the tops of the posts 3 and 3'; two top rails 7 and 7', and two intermediate rails 8 and 8' connected to the posts 2 and 2' and 6 and 6'; and any other desired members may be added to the framework. A beam 9 is suitably supported preferably by the rails 5 and 5'; a pivot-rod 10 is suitably supported by bearings 10' on the rails 8 and 8', and a cross-bar 11 is suitably connected to the upper portion of the posts 2 and 2'. A pair of vertical guides 12 and 12' are provided with a supporting bracket 13 that is secured to the beam 9, and another pair of vertical guides 14 and 14' are supported in a similar manner by the beam 9, so that the guides are supported at suitable distances apart between the posts 2 and 2' for pivotally supporting a pair of identically constructed molds 15 and 15', and a description of either mold will suffice as a description of the other one. It should be understood also that any desired or suitable number of molds may be provided, and the framework and other parts of the machine designed to accommodate the desired number of molds. Each mold comprises a back 16 and two integral sides 17 and 17' preferably composed of cast-iron, the sides extending divergently at oblique angles to the back, so that the post when molded may be readily drawn away from the back, and the upper end of the back is somewhat broader than the lower end thereof, and the sides therefore being farther apart at the upper ends than at the lower ends of the mold, so that the post may be readily drawn longitudinally from the larger end of the mold.

The lower end of the mold has a bottom 18 that forms the top of the finished post, and the bottom of course may have any desired or suitable contour. The sides of the mold have bearing-shoulders 19 and 19' respectively against which the front of the mold is held removably, the front constituting a removable pallet, as will further appear. The sides have bearing-bars 20 and 20' thereon that extend beyond the shoulders and may be formed integrally with the sides or otherwise if desired, the bearing-bars supporting a plurality of eccentrics 21 or 21' all being alike and having each a pair of trunnions 22 and 22' that are journaled in the bearing-bars 20 and 20', each eccentric having a roller 23 or 23' thereon. A front 24 or 24' is placed on a plurality of rollers when the mold is in horizontal position, and is then forced tightly against the shoulders 19 and 19' by rotation of the eccentrics within the rollers. An operating lever 25 is attached to either one of the trunnions of either one of the eccentrics, and every one of the remaining eccentrics is provided with a lever as 26 or 26' that is attached to one of the trunnions thereof, and a connecting-rod 27 is pivotally connected to all of the levers of a mold as by means of pivots 28 or 28' so that all of the eccentrics may be turned simultaneously either for securing the mold front or for releasing it so that it may be withdrawn as a pallet with the molded post thereon. The eccentrics may be constructed and mounted in any suitable manner with the trunnions formed separately and attached to the eccentrics or otherwise, as may be preferred. Each mold has a pair of trunnions 29 and 29' on the sides thereof and the trunnions are provided with journal-boxes 30 and 30' that are movable vertically in the guides, as 12 and 12' or 14 and 14' and are each supported directly by a spring 31, there being a spring 32 on the top of each bearing-box, so that the boxes may rise or fall slightly in their guides, permitting the mold to rise or fall when the springs yield slightly. The upper portions of the sides of the molds are provided with lugs 33 and 33', and the back 16 of each mold is provided at the upper portion thereof with a latch thereon, adapted to engage the bar 11 to hold the mold in upright position, but permitting the mold to rise or fall slightly. The back 16 has a suitable number of apertures 35 therein, in each of which is inserted a core-pin 36 to form a hole in the post, and the pin may be withdrawn from the mold and post before removing the post from the mold, it being designed to form a suitable number of holes in each post to receive devices whereby to fasten fencing to the posts.

Two jolters are provided for jolting the molds in order to pack the concrete therein, and each jolter comprises a hub 37 or 37', each having two arms 38 and 38' extending from one side thereof, and an arm 39 extending from the opposite side thereof, each hub being mounted rotatively on the rod 10 behind one of the molds, the arms 38 and 38' being so arranged that they may strike the under sides of the lugs 33 and 33'. The arm 39 or 39' preferably has a roller 40 mounted therein. A stop-bar 41 is mounted in the framework so as to limit the downward movement of the arms 39 and 39' when the mold is swung to a horizontal position, each arm being drawn downward by a spring 42 connected thereto and to the beam 9 or any other suitable part of the framework of the machine. A shaft 43 is rotatively supported by the beams 8 and 8' and has two vibrators mounted thereon comprising each a hub 44 or 44' movable longitudinally on the shaft and prevented from rotating on the shaft by a spline 45 or 45', the hubs having each a collar 46 or 46' thereon, one collar being connected by a shifting-rod 47 and the other one connected by a shifting-rod 47' for holding the hubs in proper positions on the shaft, or for shifting either hub along the shaft, each hub having one or more arms 48 thereon adapted to swing against the under side of the arm 39 or 39', which after being moved upward slightly permits the arm to pass on in its revolution about the shaft 43, the latter being rotated by means of a gear-wheel 49 secured thereto, and driven by a pinion 50 that is secured by a shaft 51 which is rotatively mounted on the rails 5 and 5', and has a pulley 52 secured thereto, to which a drive-belt may be connected for operation of the mechanism of the machine.

A suitable gear-frame 53 is mounted and secured on the top of the framework herein before described, and has an elevator tube or trough 54 suitably attached thereto, and extending downward at an incline angle, the lower end thereof being provided with a hopper 55, a screw 56, or any other suitable elevator apparatus being mounted in the tube or trough for elevating the plastic material that may be poured into the hopper 55, the upper end of the tube or trough being provided with a discharge pipe 54' above the plane of the tops of the molds. The frame 53 is provided with a journal-box 57, in which is mounted a rotative shaft 58, having a beveled gear-wheel 59 secured thereto that engages a bevel-gear-wheel 60 with which the screw 56 is provided, and a sprocket-wheel 61 is secured to the shaft 58 and is driven by a sprocket-chain 62 running over a sprocket-wheel 63 that is secured to the shaft 43. A horizontal conveyer tube 64 is mounted above the tops of the molds and suitably supported by the framework and is connected by a discharge-pipe 54' so as to receive the plastic material therefrom, the under side of the tube or trough 64 having two openings 65 and 65' therein, the openings being immediately above the tops of the molds and may be either entirely closed or partially closed by means of gates 66 or 66' with which they are provided. A shaft 67 is mounted rotatively in the tube or trough and has right-hand and left-hand screw-blades 68 and 69 thereon, so that the plastic material may be drawn in both directions from the middle of the tube or trough toward the ends thereof to be discharged into the molds. The shaft 67 has a sprocket-wheel 70 secured thereto on which is a chain 71 that runs over and is driven by a sprocket-wheel 72, that is secured to the shaft 43. A pair of over-flow pipes 73 and 74 are connected to the tube or trough 64 through which the plastic material may be discharged, when the gates 66 and 66' are closed, the spouts being connected to a single spout 75 that extends above the hopper 55 so as to discharge thereto.

It will be understood that a considerable number of pallets which will constitute the fronts 15 or 15' of the molds will be provided, all being formed alike and preferably of wood so as to be manufactured at the minimum cost.

For practical use the plastic material will be prepared preferably of sand, gravel, and cement, mixed with water of suitable consistency and fed into the hopper 55, while power is suitably transmitted to the shaft 51, so as to operate all of the mechanism of the machine. One of the gates 66 or 66' may be opened sufficiently to feed the plastic material into one of the molds. Before setting the mold upright, it will be understood that any desired reinforcing rods or devices may be placed in the mold or they may be inserted after a small quantity of the plastic material has been fed into the mold. By means of the shifting-rods 47 or 47' the vibrators may be adjusted on the shaft 43 so as to actuate the jolters when desired for packing the plastic material in the mold. After one mold has been filled the gate above the mold should be closed, so that the plastic material that will be fed through the tube or trough 64 will pass on and flow through the spout provided for the purpose and return to the hopper 55 to be again elevated through the tube or trough 54, and the other gate will then be opened so as to fill the other mold. The filled mold will then be swung on its pivot to a horizontal position, after which the lever 25 may be operated so as to turn all of the eccentrics and permit the front or pallet to descend slightly with the molded post thereon, and then the pallet carrying the post may be drawn from the larger end of the mold on the rollers and conveyed to any suitable place to be seasoned.

Other operations and results will be readily understood from the foregoing description.

Having thus described the invention what is claimed as new is—

1. A post-molding machine including a receptacle, a conduit connected with the receptacle and having a return discharge-pipe connected therewith and terminating above the receptacle, the conduit having an opening therein provided with a gate, and a mold movable to or away from a position below the opening.

2. A post-molding machine including a framework, guides supported by the framework, a mold provided with a pair of trunnions, boxes movable in the guides and supporting the trunnions, a jolter supported movably in the framework and having an arm to periodically lift the mold, means for moving the jolter, a conveyer having an opening therein above the mold, and a mixing elevator delivering to the conveyer.

3. A post-molding machine including a framework, guides supported by the framework, a mold provided with a pair of trunnions and also a lug, boxes movable in the guides and supporting the trunnions, springs in the guides and supporting the boxes yieldingly, a jolter supported pivotally in the framework and having an arm extending under the lug, a vibrator mounted movably in the framework to strike the jolter periodically, and means for moving the vibrator.

4. A post-molding machine including a framework, a mold having a back and two sides rigid on the back, the sides having each a trunnion rigid thereon and fixed with respect to the trunnion on the other one of the sides, boxes on the trunnions, guides supported fixedly by the frame-work and guiding the boxes vertically, means for periodically delivering blows upward to the mold, a plurality of rollers having their axes mounted movably on the two sides of the mold, a front on the sides engaged by the rollers, and means for moving the axes of the rollers.

5. A post-molding machine including a framework, vertical guides supported by the framework, boxes mounted in the guides and movable vertically therein, a mold having a back and two sides rigid on the back, the sides having each a trunnion rigid thereon and fixed with respect to the trunnion on the other one of the sides, the trunnions being mounted in the boxes, the back and sides supporting a bottom rigidly, means for periodically delivering blows upward to the mold, a plurality of eccentrics journaled in the sides of the mold and having each a lever thereon adjacent to the outer side of one of the sides, each eccentric having a roller thereon, a rod connected to all of the levers, and a front engaging the bottom and also the sides and the rollers.

6. A post-molding machine including a framework, two upright molds mounted in the framework, a horizontal conduit supported by the framework above the molds and having an inlet opening at the middle portion and also outlet openings at opposite sides of the middle portion thereof, gates to close the outlet openings, a receptacle, an inclined conduit connected with the receptacle and supported by the framework in a plane between the two molds, the inclined conduit having an outlet opening therein above the inlet opening of the horizontal conduit, a screw mounted rotatively in the inclined conduit, and a right-hand and left-hand screw mounted rotatively in the horizontal conduit and acting to convey in two directions to the outlet openings.

7. A post-molding machine including a framework, two upright molds mounted in the framework, a horizontal conduit supported by the framework above the molds and having openings therein at opposite sides of the middle portion thereof, gates to open or close the openings, a receptacle, an inclined conduit connected with the receptacle and supported by the framework in a plane between the two molds, a discharge-pipe receiving from the inclined conduit and delivering to the horizontal conduit between the openings therein, a screw mounted rotatively in the inclined conduit, a right-hand and left-hand screw mounted rotatively in the horizontal conduit and acting to convey in two directions to the openings, and two overflow spouts connected to opposite ends of the horizontal conduit and terminating above the receptacle.

8. A post molding machine including a framework, guides supported by the framework, a mold provided with a pair of trunnions and also a lug, boxes movable in the guides and supporting the trunnions, springs in the guides supporting the boxes yieldingly, a jolter supported pivotally in the framework and having an arm extending under the lug, a vibrator mounted rotatively in the framework and having an arm to strike the jolter periodically, and means for rotating the vibrator.

9. A post-molding machine including a framework having a plurality of vertical guides thereon, a plurality of molds each provided with a pair of trunnions and also a lug, boxes supporting the trunnions and mounted in the guides, springs supporting the boxes yieldingly, a shaft supported by the framework, a plurality of jolters supported pivotally by the framework and having arms extending under the lugs, a plurality of vibrators mounted rotatively in the framework and having arms to strike the jolters periodically, means for rotating the vibrators, and means for shifting the vibrators to move the arms thereof out of range with the arms of the jolters.

10. A post-molding machine including a framework having a plurality of vertical guides thereon, a plurality of molds each provided with a pair of trunnions and also a lug, boxes movable in the guides and supporting the trunnions, springs in the guides supporting the boxes yieldingly, springs mounted on the boxes and suitably seated to yieldingly hold the boxes on their supporting springs, a shaft supported in the framework, a plurality of jolters mounted pivotally on the shaft and having arms extending under the lugs, springs connected with the jolters and also with the framework and holding the arms in contact with the lugs, a plurality of vibrators mounted rotatively in the framework and having arms to strike the jolters to move the arms thereof away from the lugs, and means for rotating the vibrators.

11. A post-molding machine including a framework, a plurality of molds having trunnions that are supported in the framework, a horizontal conduit supported by the framework above the molds, a shaft journaled in the conduit and having spiral blades thereon, a sprocket-wheel secured to the shaft, a sprocket-chain on the sprocket-wheel, a horizontal shaft mounted rotatively on the framework in a plane above the horizontal conduit and having a bevel gear-wheel and also a sprocket-wheel secured thereto, a sprocket-chain on the last-mentioned sprocket wheel, an inclined conduit supported by the framework, an elevator-shaft mounted rotatively in the inclined conduit and having a bevel gear wheel secured thereto that engages the bevel gear wheel on the horizontal shaft, a spiral blade on the elevator-shaft, a discharge-pipe connected with the inclined conduit and also with the horizontal conduit, a shaft mounted rotatively in the framework, and two sprocket wheels secured to the last-mentioned shaft and each one having either one of the aforementioned sprocket-chains connected therewith.

12. A post-molding machine including a framework, a plurality of boxes supported in the framework, and a plurality of molds comprising each a back and two sides formed integrally with the back and also a bottom that is rigid on the back and the sides, each side having a trunnion thereon, the trunnions of each mold being mounted in a pair of the boxes, said sides having bearing-bars thereon, a plurality of eccentrics having trunnions that are mounted in the bearing-bars, one trunnion of each eccentric having a lever thereon at the outer side of one of the mold-sides, rollers on the eccentrics, a connecting-rod pivoted to all the levers, and a mold-front between the mold-sides and the rollers.

In testimony whereof, I affix my signature in presence of two witnesses.

CHARLES O. WILEY.

Witnesses:
   GUS A. HALL,
   EDWIN SINES.